United States Patent
Lee et al.

(10) Patent No.: US 9,367,937 B2
(45) Date of Patent: Jun. 14, 2016

(54) APPARATUS AND METHOD FOR EFFECTIVE GRAPH CLUSTERING OF PROBABILISTIC GRAPHS

(71) Applicant: Samsung Electronics Co., Ltd., Suwon-si (KR)

(72) Inventors: Chun-Hee Lee, Nonsan-si (KR); Seok-Jin Hong, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 344 days.

(21) Appl. No.: 13/932,326

(22) Filed: Jul. 1, 2013

(65) Prior Publication Data
US 2014/0009471 A1    Jan. 9, 2014

(30) Foreign Application Priority Data
Jul. 5, 2012 (KR) .................... 10-2012-0073538

(51) Int. Cl.
*G06T 11/20*    (2006.01)

(52) U.S. Cl.
CPC .................... *G06T 11/206* (2013.01)

(58) Field of Classification Search
None
See application file for complete search history.

(56) References Cited

U.S. PATENT DOCUMENTS

| 7,788,210 B2 | 8/2010 | Lang et al. |
| 2012/0041920 A1 | 2/2012 | Kim et al. |
| 2012/0070091 A1 | 3/2012 | Saund |

FOREIGN PATENT DOCUMENTS

| JP | 2012-064216 A | 3/2012 |
| KR | 10-2011-0096236 A | 8/2011 |
| KR | 10-2012-0015693 A | 2/2012 |

OTHER PUBLICATIONS

Flake et al., "Graph Clustering and Minimum Cut Trees", Internet Mathematics, 2004, pp. 385-408 (24 pages), vol. 1, No. 4.
Kollios et al., "Clustering Large Probabilistic Graphs", IEEE Transaction on Knowledge and Data Engineering, Nov. 29, 2011, pp. 1-13 (13 pages).
Riesen et al., "Classification and Clustering of Vector Space Embedded Graphs", Sep. 8, 2009, 344 pages.

*Primary Examiner* — David H Chu
(74) *Attorney, Agent, or Firm* — NSIP Law

(57) ABSTRACT

A clustering apparatus of probabilistic graphs, includes a center selection unit configured to select one or more centers among the probabilistic graphs. The clustering apparatus further includes a center determination unit configured to calculate a minimum bound and a maximum bound of a distance with respect to each of the centers, for each of the probabilistic graphs, and determine a center, among the centers, to which the probabilistic graphs are to be allocated based on the minimum and maximum bounds. The clustering apparatus further includes a clustering unit configured to allocate the probabilistic graphs to the center to generate one or more clusters.

19 Claims, 8 Drawing Sheets

APPARATUS AND METHOD FOR EFFECTIVE GRAPH CLUSTERING OF PROBABILISTIC GRAPHS

CROSS-REFERENCE TO RELATED APPLICATION

This application claims the benefit under 35 USC 119(a) of a Korean Patent Application No. 10-2012-0073538, filed on Jul. 5, 2012, in the Korean Intellectual Property Office, the entire disclosure of which is incorporated herein by reference for all purposes.

BACKGROUND

1. Field

The following description relates to an apparatus and a method for effective graph clustering of probabilistic graphs.

2. Description of the Related Art

The development of computer technologies have accelerated the generation, use and analysis of various types of data, such as text, image, audio, video, sequence, and high-dimensional data. A graph is an abstract data type that may be used to represent such data, and may represent a data element as a node and a relationship between data elements as an edge. In various fields, such as social networking and genetic analysis, data representation and analysis technologies based on such a graph have been utilized.

Clustering is a method of analyzing graph data, and may be classified into node clustering and graph clustering. Node clustering is a clustering method of partitioning a single large graph into a plurality of dense sub-graphs, and graph clustering is a clustering method of gathering small graphs including similar shapes.

Research on node clustering has been relatively actively conducted, but research on graph clustering has been hardly conducted. In addition, since a graph cannot reflect uncertainty of the real world, a real-world phenomenon may be restrictively modeled, and therefore, accuracy of data may be deteriorated resulting in deterioration in accuracy of clustering.

SUMMARY

In one general aspect, there is provided a clustering apparatus of probabilistic graphs, including a center selection unit configured to select one or more centers among the probabilistic graphs. The clustering apparatus further includes a center determination unit configured to calculate a minimum bound and a maximum bound of a distance with respect to each of the centers, for each of the probabilistic graphs, and determine a center, among the centers, to which the probabilistic graphs are to be allocated based on the minimum and maximum bounds. The clustering apparatus further includes a clustering unit configured to allocate the probabilistic graphs to the center to generate one or more clusters.

In another general aspect, there is provided a clustering method of probabilistic graphs, including selecting one or more centers among the probabilistic graphs. The clustering method further includes calculating a minimum bound and a maximum bound of a distance with respect to each of the centers, for each of the probabilistic graphs, and determining a center, among the centers, to which the probabilistic graphs are to be allocated based on the minimum and maximum bounds. The clustering method further includes allocating the probabilistic graphs to the center to generate one or more clusters.

Other features and aspects will be apparent from the following detailed description, the drawings, and the claims.

DETAILED DESCRIPTION

Figure 1:
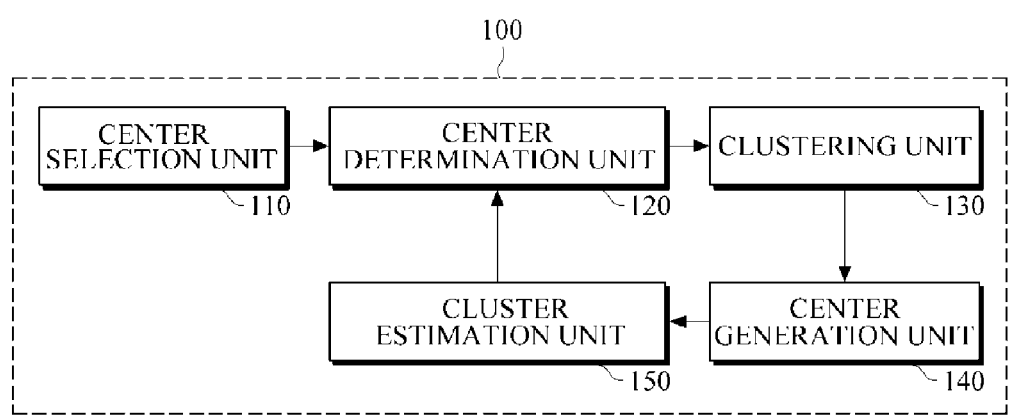
FIG. 1 is a block diagram illustrating an example of a clustering apparatus of probabilistic graphs

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. Also, descriptions of functions and constructions that are well known to one of ordinary skill in the art may be omitted for increased clarity and conciseness.

Throughout the drawings and the detailed description, the same reference numerals refer to the same elements. The drawings may not be to scale, and the relative size, proportions, and depiction of elements in the drawings may be exaggerated for clarity, illustration, and convenience.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

FIG. 1 is a block diagram illustrating an example of a clustering apparatus 100 of probabilistic graphs. Referring to FIG. 1, the clustering apparatus 100 includes a center selection unit 110, a center determination unit 120, a clustering unit 130, a center generation unit 140, and a cluster estimation unit 150. The probabilistic graphs will be described with reference to FIGS. 2A and 2B.

Figure 2:
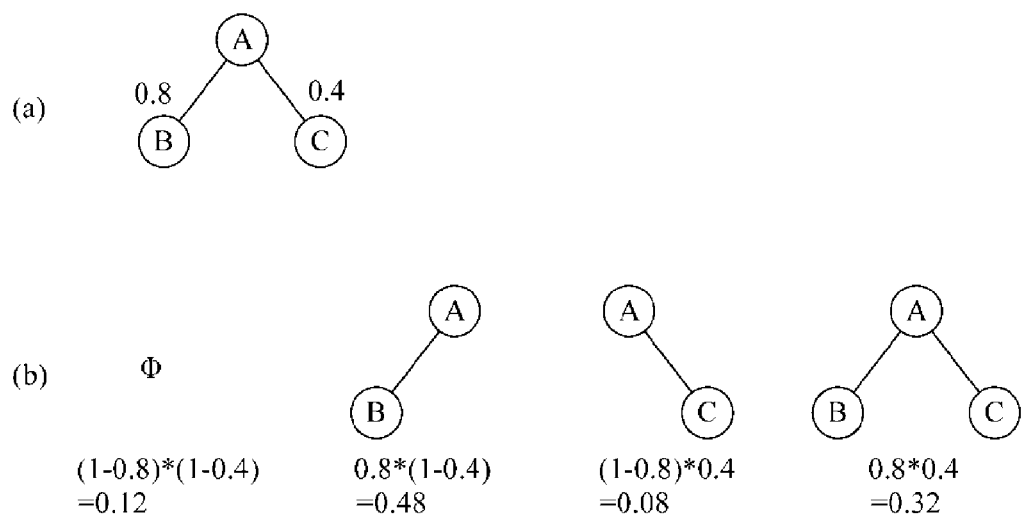
FIGS. 2A and 2B are diagrams illustrating examples of a probabilistic graph and graph instances.

FIGS. 2A and 2B are diagrams illustrating examples of a probabilistic graph and graph instances. In FIG. 2A, the probabilistic graph indicates that a probability $P_{AB}$ of an edge (A,B) being generated with respect to nodes A, B, and C is 0.8, and that a probability $P_{AC}$ of an edge (A,C) being generated is 0.4. In FIG. 2B, first to fourth graph instances of all graph instances created through the probabilistic graph of FIG. 2A, are illustrated. A probability of the first graph instance in which no edge is generated is $(1-P_{AB})*(1-P_{AC})=0.12$, and a probability of the second graph instance in which only the edge (A,B) is generated is $P_{AB}*(1-P_{AC})=0.48$. A probability of the third graph instance in which only the edge (A,C) is generated is $(1-P_{AB})*P_{AC}=0.08$, and a probability of the fourth graph instance in which both the edges (A,B) and (A,C) are generated is $P_{AB}*P_{AC}=0.32$.

Referring again to FIG. 1, the center selection unit 110 selects one or more centers to be used to cluster probabilistic graphs. For example, the center selection unit 110 may select arbitrary k centers (e.g., points) among the probabilistic graphs in the same manner as in a k-means clustering method.

The center determination unit 120 calculates a minimum bound and a maximum bound of a distance between a probabilistic graph, among the probabilistic graphs, and each of the centers, for each of the probabilistic graphs. In addition, the center determination unit 120 determines a single center, among the centers, to which the probabilistic graphs are to be allocated based on the minimum and maximum bounds for each of the probabilistic graphs. For example, the center to which the probabilistic graphs are to be allocated may be located at a nearest distance from each of the probabilistic graphs.

A graph edit distance between probabilistic graphs may be calculated based on the following Equation 1:

$$D(G_1, G_2) = \sum_{g_2 \in G_2} \sum_{g_1 \in G_1} \{P(g_1)P(g_2)d(g_1, g_2)\} \quad (1)$$

In Equation 1, $D(G_1, G_2)$ denotes a graph edit distance between probabilistic graphs $G_1$ and $G_2$, $g_1$ denotes a graph instance of the probabilistic graph $G_1$, and $g_2$ denotes a graph instance of the probabilistic graph $G_2$. $P(g_1)$ denotes a probability that the graph instance $g_1$ is generated, and $P(g_2)$ denotes a probability that the graph instance $g_2$ is generated. In addition, $d(g_1, g_2)$ is a graph edit distance between the graph instances $g_1$ and $g_2$.

In this manner, in order to calculate the graph edit distance $D(G_1, G_2)$ between the probabilistic graphs $G_1$ and $G_2$, graph edit distances with respect to all graph instances of probabilistic graphs $G_1$ and $G_2$ should be obtained. However, Equation 1 may be denoted as the following Equation 2, as described with reference to George Kollios, Michalis Potamias, Evimaria Terzi, "Clustering Large Probabilistic Graphs," *IEEE Transactions on Knowledge and Data Engineering*, vol. 25, no. 2, pp. 325-336, February 2013:

$$D(G_1, G_2) = \sum_{\substack{\{u,v\} \in V \times V \\ u < v}} \{P_{uv}(1 - P'_{uv}) + (1 - P_{uv})P'_{uv}\} \quad (2)$$

In Equation 2, $P_{uv}$ and $P'_{uv}$ respectively denote probabilistic matrices with respect to the probabilistic graphs $G_1$ and $G_2$. In addition, u and v respectively denote nodes included in a set V of nodes of the probabilistic graphs $G_1$ and $G_2$.

In the k-means clustering method, a center of a minimum distance may be determined by calculating accurate distances with respect to all centers that are selected, based on Equation 1 or 2. However, unlike multi-dimensional data, all graph instances of a probabilistic graph should be calculated in order to obtain a distance of the probabilistic graph, which is time-consuming.

Accordingly, the center determination unit 120 may rapidly determine a center of a minimum distance, namely, a center located at a nearest distance from each of probabilistic graphs, based on only a minimum of edge information of each of the probabilistic graphs without using all of the edge information. The edge information of a probabilistic graph, among the probabilistic graphs, is of each of edges of the probabilistic graph, and may include a name of each of the edges edge and a probability that each of the edges is generated. Hereinafter, the determining of the center to which the probabilistic graphs are to be allocated will be described in detail with reference to FIGS. 3 to 5.

Figure 3:
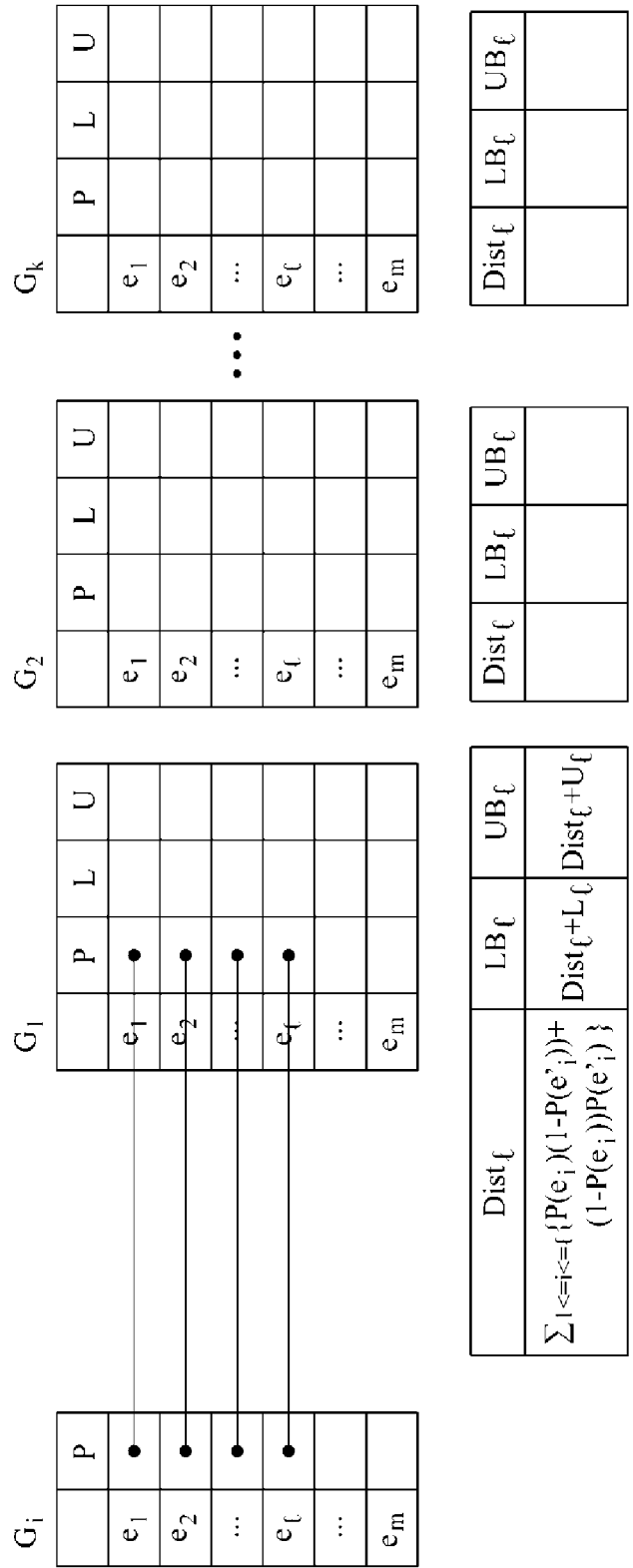
FIGS. 3 to 5 are diagrams illustrating an example of a method of determining a center to which probabilistic graphs are to be allocated.
Figure 4:
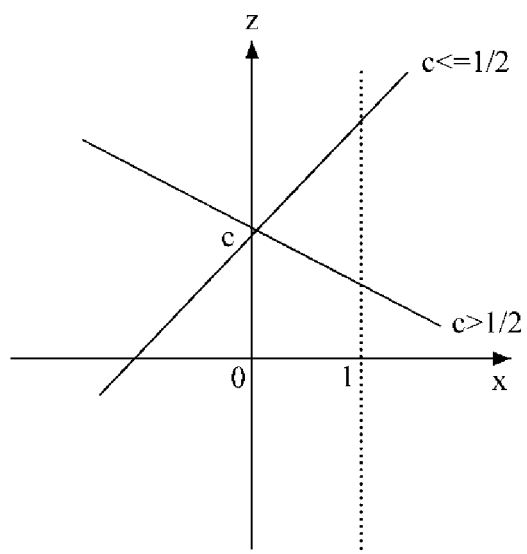
Figure 5:
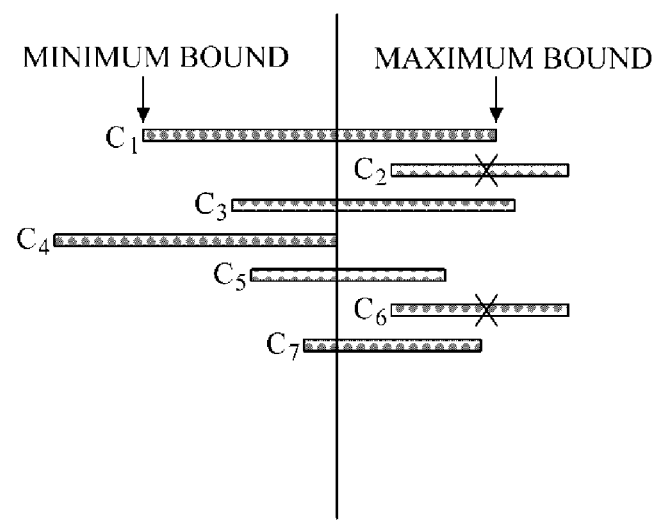

FIGS. 3 to 5 are diagrams illustrating an example of a method of determining a center to which probabilistic graphs are to be allocated. In FIG. 3, a method of calculating a minimum bound and a maximum bound is illustrated. In FIG. 4, a method of calculating a minimum value and a maximum value of a distance is illustrated. In FIG. 5, the minimum bound and the maximum bound that are calculated in FIG. 3 are illustrated.

Referring to FIG. 3, a probabilistic graph $G_i$ includes m pieces of edge information. The pieces of the edge information are represented by respective edge names $e_1$ to $e_m$, and include respective probabilities $P(e_1)$ to $P(e_m)$.

The center determination unit 120 of FIG. 1 calculates a minimum bound and a maximum bound of a distance between the probabilistic graph $G_i$ and each of k centers $C_1$ to $C_k$ based on a portion of the edge information (e.g., partial edge information) of the probabilistic graph $G_i$. However, for convenience of description, a method of calculating a minimum bound and a maximum bound with respect to a single center $C_1$ will be described.

In more detail, the center determination unit 120 selects partial edges $e_1$ to $e_l$ of m edges $e_1$ to $e_m$ of each of probabilistic graphs $G_1, G_2, \ldots,$ and $G_k$, and calculates a partial distance $Dist_l$ with the center $C_1$ based on Equation 2 using partial edge information of the selected partial edges $e_1$ to $e_l$. The partial distance $Dist_l$ may be represented as an equation shown in FIG. 3, which is based on Equation 2.

Next, the center determination unit 120 calculates a minimum value $L_l$ and a maximum value $U_l$ of a distance with the center $C_1$ based on remaining edge information of remaining edges $e_{l+1}$ to $e_m$ of the m edges $e_1$ to $e_n$, of each of probabilistic graphs $G_1, G_2, \ldots,$ and $G_k$. The method of calculating the minimum value and the maximum value will be described in detail with reference to FIG. 4.

Referring to FIG. 4, when Equation 2 is represented as $z=f(x,y)=x(1-y)+(1-x)y$, and y is substituted with a constant c assuming that y is known in advance, Equation 2 is represented as $z=f(x,c)=x(1-c)+(1-x)c$. When $z=f(x,c)=x(1-c)+(1-x)c$ is represented as a graph, a graph shown in FIG. 4 is obtained. When c is less than or equal to ½, $z=f(x,c)$ is a straight line whose inclination is a positive number, and when c is greater ½, $z=f(x,c)$ is a straight line whose inclination is a negative number. Consequently, in a range of a probability value x, that is, $0<=x<=1$, a minimum value and a maximum value of $z=f(x,c)$ are respectively c and $1-c$ when $c<=½$ is satisfied, and respectively $1-c$ and c when $c>½$ is satisfied.

Accordingly, the minimum value $L_l$ and the maximum value $U_l$ in an l state may be respectively calculated based on the following examples of Equations 3 and 4:

$$L_l = \begin{cases} P(e_{l+1}) + L_{l+1}, & \text{if } P(e_{l+1}) \leq \frac{1}{2} \\ (1 - P(e_{l+1})) + L_{l+1}, & \text{if } P(e_{l+1}) > \frac{1}{2} \end{cases} \quad (3)$$

$$U_l = \begin{cases} (1 - P(e_{l+1})) + U_{l+1}, & \text{if } P(e_{l+1}) \leq \frac{1}{2} \\ P(e_{l+1}) + U_{l+1}, & \text{if } P(e_{l+1}) > \frac{1}{2} \end{cases} \quad (4)$$

Referring again to FIG. 3, the center determination unit 120 adds the calculated minimum value $L_l$ to the calculated partial distance $Dist_l$ to calculate a minimum bound $LB_l$, and adds the calculated maximum value $U_l$ to the calculated partial distance $Dist_l$ to calculate a maximum bound $UB_l$. The minimum bound $LB_l$ and the maximum bound $UB_l$ denote the minimum bound and the maximum bound, respectively, of the distance with the center $C_1$ when only the partial edges $e_1$ to $e_l$ are selected.

The center determination unit 120 filters out at least one center including no possibility of being allocated with probabilistic graphs, among the k centers $C_1$ to $C_k$, based on the calculated minimum and maximum bounds of each of centers. That is, the center determination unit 120 filters out the center including no possibility that a distance between a probabilistic graph and the center is a minimum value.

For example, referring to FIG. 5, since a minimum bound of each of the centers $C_2$ and $C_6$ is greater than a maximum bound of the center $C_4$, there is no possibility that a distance between a probabilistic graph and each of the centers $C_2$ and $C_6$ is a minimum value, and therefore, these centers $C_2$ and $C_6$ are filtered out. If a number of remaining centers after filtering is one, the center determination unit 120 determines a remaining center as the center to which the probabilistic graphs are to be allocated.

If the number of the remaining centers after filtering is at least two, the center determination unit 120 further selects new partial edge information of each of the probabilistic graphs, and repeatedly performs the above-described method with respect to the remaining centers, e.g., $C_1, C_3, C_4, C_5$, and $C_7$. For example, if the center determination unit 120 previously-selected the partial edges $e_1$ to $e_l$, the center determination unit 120 selects partial edges $e_1$ to $e_{l+1}$, calculates a partial distance $Dist_{l+1}$ based on the new partial edge information of the partial edges $e_1$ to $e_{l+1}$, and calculates a minimum value $L_{l+1}$ and a maximum value $U_{l+1}$ based on new remaining edge information of remaining edges $e_{l+2}$ to $e_m$. Next, the center determination unit 120 calculates a minimum bound $LB_{l+1}$ and a maximum bound $UB_{l+1}$ with respect to each of the remaining centers $C_1, C_3, C_4, C_5$, and $C_7$, and the filtering is performed again using calculated results. Until the number of the remaining centers is one, the above-described method is repeatedly performed, whereby a final single center to which the probabilistic graphs are to be allocated, is determined.

Referring again to FIG. 1, the clustering unit 130 allocates probabilistic graphs to the determined center to generate one or more clusters. Since the probabilistic graphs are subjected to clustering with respect to k centers that are arbitrarily selected, k clusters may be generated.

The center generation unit 140 regenerates a center for each of the clusters generated by the clustering unit 130. The center for each of the clusters may be regenerated based on (e.g., to include or indicate) an average value of probabilities with respect to each of the edges of the probabilistic graphs included in each of the clusters, as shown in the following example of Equation 5:

$$V = V_1 \cup V_2 \cup \ldots \cup V_n \qquad (5)$$

$$P_{ij} = \frac{1}{n} \sum_{k=1}^{n} (P_k)_{ij}$$

In Equation 5, when the probabilistic graphs included in each of the clusters are $G_1(V_1,P_1), G_2(V_2,P_2), \ldots$, and $G_n(V_n,P_n)$, each of $V_1, V_2, \ldots$, and $V_u$ denotes a set of nodes in a respective probabilistic graph, and each of $P_1, P_2, \ldots$, and $P_n$ denotes a set of the probabilities with respect to the edges in a respective probabilistic graph. In addition, $P_{ij}$ denotes a probability that an edge (i,j) is generated.

Figure 6:
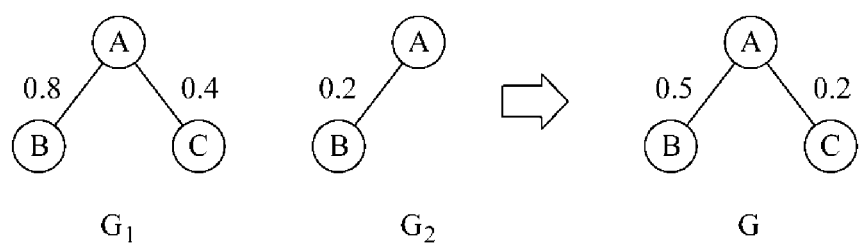
FIG. 6 is a diagram illustrating an example of a center for a cluster.

FIG. 6 is a diagram illustrating an example of a center for a cluster. Referring to FIG. 6, when probabilistic graphs $G_1$ and $G_2$ are allocated to an arbitrary cluster, a center G of the cluster is regenerated based on Equation 5. That is, a set of nodes of the center G is a union $\{A, B, C\}$ of sets of nodes of the respective probabilistic graphs $G_1$ and $G_2$, and the center G includes or indicates that a probability that an edge (A,B) is generated is $\frac{1}{2}*(0.8+0.2)=0.5$ based on Equation 5, and that a probability that an edge (A,C) is generated is $\frac{1}{2}*(0.4+0)=0.2$ based on Equation 5.

Referring again to FIG. 1, the cluster estimation unit 150 determines whether predetermined criteria are satisfied to estimate whether each of the generated clusters is accurately generated. When the predetermined criteria are not satisfied, the cluster estimation unit 150 enables the center determination unit 120 to redetermine a center to which the probabilistic graphs are to be allocated, based on the regenerated center for each of the clusters.

In an example, the predetermined criteria may be variously defined, for example, may be a preset number of iterations. A user may determine the optimal number of the iterations based on various conditions, such as a number of the probabilistic graphs, a distribution of the probabilistic graphs, and/or other conditions known to one of ordinary skill in the art. The user may set the number of the iterations in advance based on conditions of probabilistic graphs to be subjected to clustering.

In another example, the predetermined criteria may be a case in which the center generation unit 140 newly generates a center for each of the clusters that is the same as a previously-generated center for a respective cluster, or is positioned within an allowable error range from the previously-generated center for the respective cluster. That is, if there is no change because the newly-generated center and the previously-generated center while repeatedly performing the center generation method, it may be estimated that the respective cluster is accurately generated.

In still another example, the predetermined criteria may be a case in which a criterion function value E is calculated every time the cluster is generated, and the criterion function value is within an allowable range, as shown in the following example of Equation 6:

$$E = \sum_{i=1}^{k} \left\{ \frac{1}{|C_i|} \sum_{G \in C} D(G_j, Center_i) \right\} \qquad (6)$$

In Equation 6, $C_i$ denotes an i-th cluster, and $Center_i$ denotes a center of the i-th cluster $C_i$.

Figure 7:
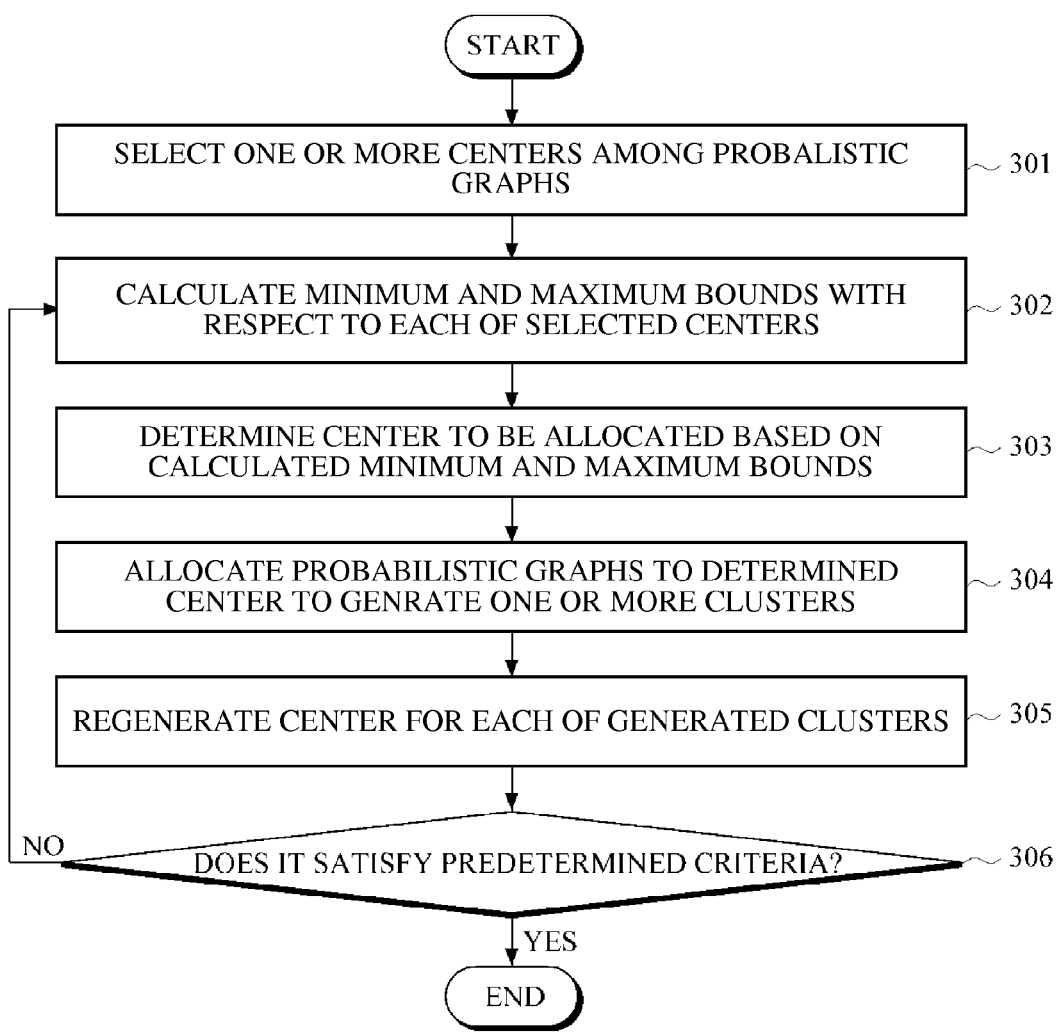
FIG. 7 is a flowchart illustrating an example of a clustering method of probabilistic graphs.

FIG. 7 is a flowchart illustrating an example of a clustering method of probabilistic graphs. Referring to FIG. 7, the clustering method of the probabilistic graphs may be performed by the clustering apparatus 100 of the probabilistic graphs of FIG. 1.

In operation 301, the clustering apparatus 100 selects one or more centers among the probabilistic graphs.

In operation 302, the clustering apparatus 100 calculates a minimum bound and a maximum bound with respect to each of the selected centers, for each of the probabilistic graphs.

In operation 303, the clustering apparatus 100 determines a single center, among the centers, to which the probabilistic graphs are to be allocated based on the calculated minimum and maximum bounds for each of the probabilistic graphs. For example, the center to which the probabilistic graphs are to be allocated may be located at a nearest distance from each of the probabilistic graphs. Unlike a center of a minimum distance that is determined based on a graph edit distance with respect to all centers that is calculated based on Equation 1 or 2 in each of the probabilistic graphs, the minimum bound and the maximum bound with respect to each of the centers may be calculated based on only partial edge information of a probabilistic graph to thereby determine a center of a minimum distance.

In operation 304, the clustering apparatus 100 allocates the probabilistic graphs to the determined center to generate one or more clusters.

In operation 305, the clustering apparatus 100 regenerates a center for each of the generated clusters. For example, the center for each of the clusters may be regenerated based on an average value of probabilities with respect to each of edges of the probabilistic graphs included in each of the clusters, as described above with reference to Equations 5 and 6.

In operation 306, the clustering apparatus 100 determines whether predetermined criteria are satisfied to estimate whether each of the generated clusters is accurately generated. When the predetermined criteria are determined to not be satisfied, the method returns to operation 302. Otherwise, the method ends.

Figure 8:
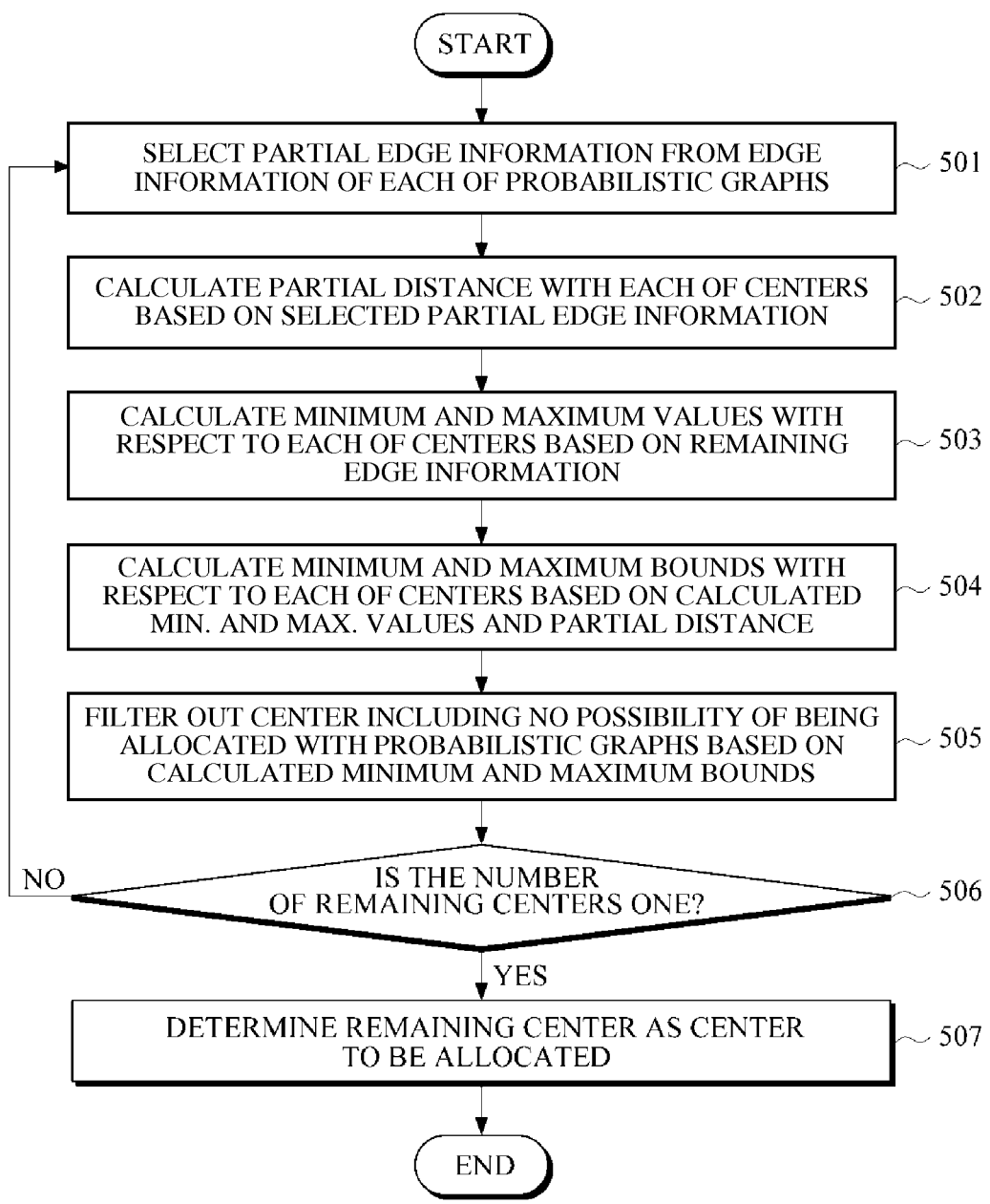
FIG. 8 is a flowchart illustrating an example of a method of calculating bounds and determining a center to be allocated in the clustering method of FIG. 7.

FIG. 8 is a flowchart illustrating an example of a method of calculating bounds and determining a center to be allocated in the clustering method of FIG. 7. In more detail, a method of calculating a minimum bound and a maximum bound with respect to each of centers selected among probabilistic graphs, and determining a single center to which the probabilistic graphs are to be allocated based on the calculated minimum and maximum bounds with respect to each of the centers, will be described in detail with reference to FIG. 8. This method may be performed by the clustering apparatus 100 of the probabilistic graphs of FIG. 1.

In operation 501, the clustering apparatus 100 selects partial edge information from edge information of each of the probabilistic graphs.

In operation 502, the clustering apparatus 100 calculates a partial distance with each of remaining centers based on the selected partial edge information.

In operation 503, the clustering apparatus 100 calculates a minimum value and a maximum value with respect to each of the remaining centers based on remaining edge information from the edge information of each of the probabilistic graphs.

In operation 504, the clustering apparatus 100 calculates the minimum and maximum bounds with respect to each of the remaining centers based on the calculated minimum and maximum values, respectively, and the calculated partial distance. In more detail, the calculated minimum value is added to the calculated partial distance to calculate the minimum bound, and the calculated maximum value is added to the calculated partial distance to calculate the maximum bound.

In operation 505, the clustering apparatus 100 filters out at least one center including no possibility of being allocated with the probabilistic graphs, among the remaining centers, based on the calculated minimum and maximum bounds of each of the remaining centers.

In operation 506, the clustering apparatus 100 determines whether a number of the remaining centers is one. If the number of the remaining centers is determined to be one, the method continues in operation 507. Otherwise, the method returns to operation 501.

In operation 507, the clustering apparatus 100 determines a remaining center as the center to which the probabilistic graphs are to be allocated.

The examples of a clustering apparatus and a clustering method described may eliminate centers whose distance with an arbitrary probabilistic graph cannot be a minimum, while further sequentially selecting partial edge information of the probabilistic graph until a number of remaining centers is one with respect to the probabilistic graph. The centering method may be performed with respect to only the remaining centers, and therefore, it is possible to significantly reduce processing time compared to clustering probabilistic graphs based on a graph edit distance with respect to all centers that is calculated based on entire edge information.

The various units, modules, elements, and methods described above may be implemented using one or more hardware components, one or more software components, or a combination of one or more hardware components and one or more software components.

A hardware component may be, for example, a physical device that physically performs one or more operations, but is not limited thereto. Examples of hardware components include microphones, amplifiers, low-pass filters, high-pass filters, band-pass filters, analog-to-digital converters, digital-to-analog converters, and processing devices.

A software component may be implemented, for example, by a processing device controlled by software or instructions to perform one or more operations, but is not limited thereto. A computer, controller, or other control device may cause the processing device to run the software or execute the instructions. One software component may be implemented by one processing device, or two or more software components may be implemented by one processing device, or one software component may be implemented by two or more processing devices, or two or more software components may be implemented by two or more processing devices.

A processing device may be implemented using one or more general-purpose or special-purpose computers, such as, for example, a processor, a controller and an arithmetic logic unit, a digital signal processor, a microcomputer, a field-programmable array, a programmable logic unit, a microprocessor, or any other device capable of running software or executing instructions. The processing device may run an operating system (OS), and may run one or more software applications that operate under the OS. The processing device may access, store, manipulate, process, and create data when running the software or executing the instructions. For simplicity, the singular term "processing device" may be used in the description, but one of ordinary skill in the art will appreciate that a processing device may include multiple processing elements and multiple types of processing elements. For example, a processing device may include one or more processors, or one or more processors and one or more controllers. In addition, different processing configurations are possible, such as parallel processors or multi-core processors.

A processing device configured to implement a software component to perform an operation A may include a processor programmed to run software or execute instructions to control the processor to perform operation A. In addition, a processing device configured to implement a software component to perform an operation A, an operation B, and an operation C may include various configurations, such as, for example, a processor configured to implement a software component to perform operations A, B, and C; a first processor configured to implement a software component to perform operation A, and a second processor configured to implement a software component to perform operations B and C; a first processor configured to implement a software component to perform operations A and B, and a second processor configured to implement a software component to perform operation C; a first processor configured to implement a software component to perform operation A, a second processor configured to implement a software component to perform operation B, and a third processor configured to implement a software component to perform operation C; a first processor configured to implement a software component to perform operations A, B, and C, and a second processor configured to implement a software component to perform operations A, B, and C, or any other configuration of one or more processors each implementing one or more of operations A, B, and C. Although these examples refer to three operations A, B, C, the number of operations that may implemented is not limited to three, but may be any number of operations required to achieve a desired result or perform a desired task.

Software or instructions that control a processing device to implement a software component may include a computer program, a piece of code, an instruction, or some combination thereof, that independently or collectively instructs or configures the processing device to perform one or more desired operations. The software or instructions may include machine code that may be directly executed by the processing device, such as machine code produced by a compiler, and/or higher-level code that may be executed by the processing device using an interpreter. The software or instructions and any associated data, data files, and data structures may be embodied permanently or temporarily in any type of machine, component, physical or virtual equipment, computer storage medium or device, or a propagated signal wave capable of providing instructions or data to or being interpreted by the processing device. The software or instructions and any associated data, data files, and data structures also may be distributed over network-coupled computer systems so that the software or instructions and any associated data, data files, and data structures are stored and executed in a distributed fashion.

For example, the software or instructions and any associated data, data files, and data structures may be recorded, stored, or fixed in one or more non-transitory computer-readable storage media. A non-transitory computer-readable storage medium may be any data storage device that is capable of storing the software or instructions and any associated data, data files, and data structures so that they can be read by a computer system or processing device. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, or any other non-transitory computer-readable storage medium known to one of ordinary skill in the art.

Functional programs, codes, and code segments that implement the examples disclosed herein can be easily constructed by a programmer skilled in the art to which the examples pertain based on the drawings and their corresponding descriptions as provided herein.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A clustering apparatus of probabilistic graphs, comprising:
   a center selection processor configured to select one or more centers among the probabilistic graphs;
   a center determination processor configured to
      calculate a minimum bound and a maximum bound of a distance with respect to each of the centers, for each of the probabilistic graphs, and
      determine a center, among the centers, to which the probabilistic graphs are to be allocated based on the minimum and maximum bounds; and
   a clustering processor configured to allocate the probabilistic graphs to the center to generate one or more clusters that are used for data analysis.

2. The clustering apparatus according to claim 1, further comprising:
   a center generation unit configured to regenerate a center for each of the clusters.

3. The clustering apparatus according to claim 2, further comprising:
   a cluster estimation unit configured to determine whether predetermined criteria are satisfied,
   wherein the center determination processor is further configured to redetermine the center to which the probabilistic graphs are to be allocated based on the regenerated center in response to the predetermined criteria being determined to not be satisfied.

4. The clustering apparatus according to claim 3, wherein the predetermined criteria comprises a preset number of iterations, or a case in which the regenerated center and a preceding center are within an allowable range of each other, or a case in which a criterion function value calculated based on the regenerated center is within an allowable range, or any combination thereof.

5. The clustering apparatus according to claim 2, wherein the center generation unit is further configured to:
   regenerate the center for each of the clusters based on an average value of probabilities of each of edges of the probabilistic graphs.

6. The clustering apparatus according to claim 1, wherein the center determination processor is further configured to:
   calculate a partial distance with each of the centers based on a portion of edge information for each of the probabilistic graphs;
   calculate a minimum value and a maximum value of the distance with respect to each of the centers based on a remaining portion of the edge information; and
   calculate the minimum and maximum bounds based on the minimum and maximum values, respectively, and the partial distance.

7. The clustering apparatus according to claim 6, wherein the edge information comprises a name of each of edges for each of the probabilistic graphs, and a probability of each of the edges.

8. The clustering apparatus according to claim 1, wherein the center determination processor is further configured to:
   filter out a center without a possibility of being allocated with the probabilistic graphs, among the centers, based on the minimum and maximum bounds.

9. The clustering apparatus according to claim 8, wherein the center determination processor is further configured to:
   determine a remaining center as the center to be allocated in response to a number of remaining centers after the filtering being one; and
   recalculate the minimum and maximum bounds with respect to each of the remaining centers in response to the number of the remaining centers after the filtering being at least two.

10. A clustering method of probabilistic graphs, comprising:
   selecting, at a processor, one or more centers among the probabilistic graphs;
   calculating, at the processor, a minimum bound and a maximum bound of a distance with respect to each of the centers, for each of the probabilistic graphs;
   determining, at the processor, a center, among the centers, to which the probabilistic graphs are to be allocated based on the minimum and maximum bounds; and
   allocating, at the processor, the probabilistic graphs to the center to generate one or more clusters that are used for data analysis.

11. The clustering method according to claim 10, further comprising:
   regenerating a center for each of the clusters.

12. The clustering method according to claim 11, further comprising:
   determining whether predetermined criteria are satisfied; and
   redetermining the center to which the probabilistic graphs are to be allocated based on the regenerated center in response to the predetermined criteria being determined to not be satisfied.

13. The clustering method according to claim 12, wherein the predetermined criteria comprises a preset number of iterations, or a case in which the regenerated center and a preceding center are within an allowable range of each other, or a case in which a criterion function value calculated based on the regenerated center is within an allowable range, or any combination thereof.

14. The clustering method according to claim 11, wherein the regenerating comprises:
   regenerating the center for each of the clusters based on an average value of probabilities of each of edges of the probabilistic graphs.

15. The clustering method according to claim 10, wherein the calculating comprises:
   calculating a partial distance with each of the centers based on a portion of edge information for each of the probabilistic graphs;
   calculating a minimum value and a maximum value of the distance with respect to each of the centers based on a remaining portion of the edge information; and
   calculating the minimum and maximum bounds based on the minimum and maximum values, respectively, and the partial distance.

16. The clustering method according to claim 15, wherein the edge information comprises a name of each of edges for each of the probabilistic graphs, and a probability of each of the edges.

17. The clustering method according to claim 10, wherein the determining comprises:
   filtering out a center without a possibility of being allocated with the probabilistic graphs, among the centers, based on the minimum and maximum bounds.

18. The clustering method according to claim 17, wherein the determining further comprises:
   determining a remaining center as the center to be allocated in response to a number of remaining centers after the filtering being one; and
   recalculating the minimum and maximum bounds with respect to each of the remaining centers in response to the number of the remaining centers after the filtering being at least two.

19. A non-transitory computer-readable storage medium storing a program comprising instructions to cause a computer to perform the clustering method of claim 10.

* * * * *